United States Patent Office 3,490,157
Patented Jan. 20, 1970

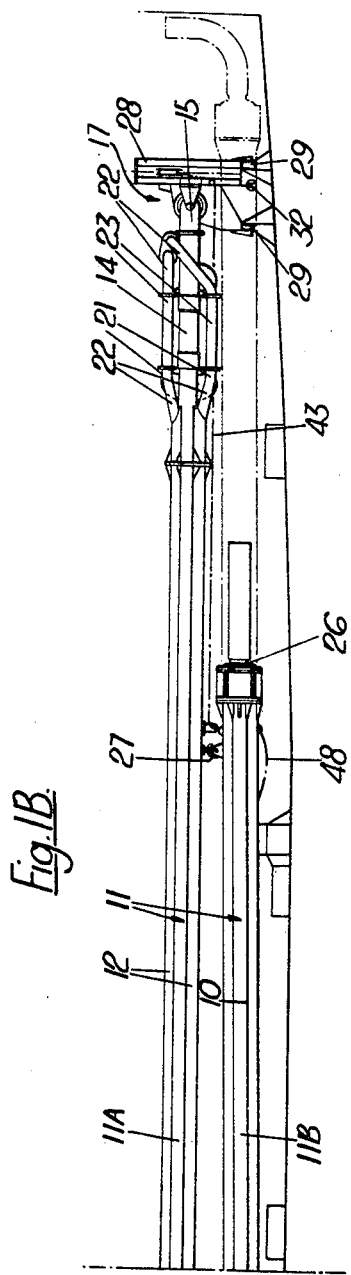

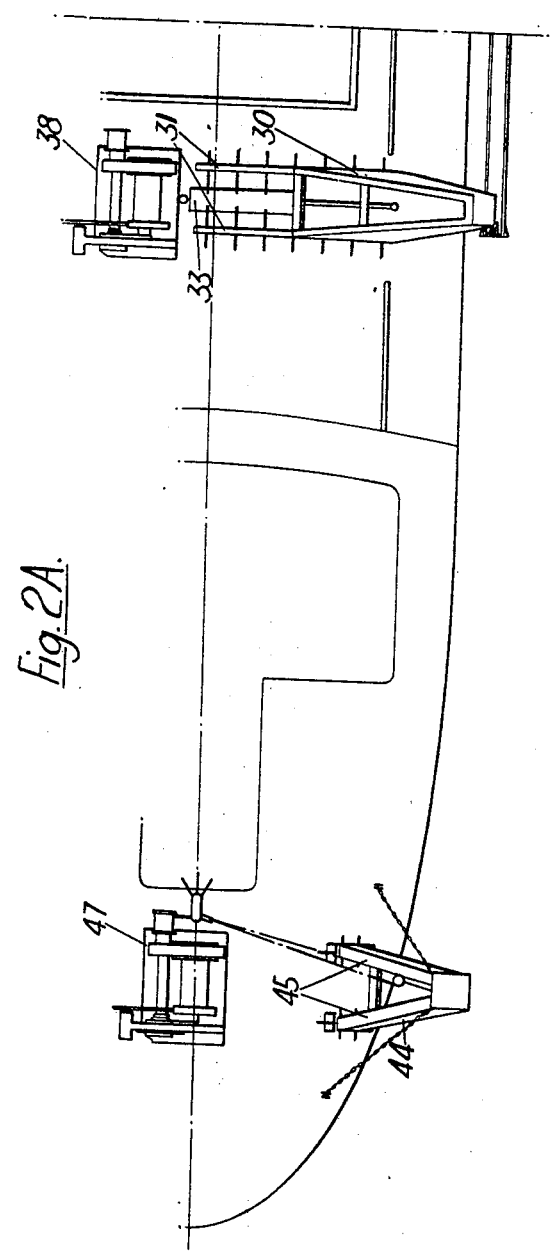

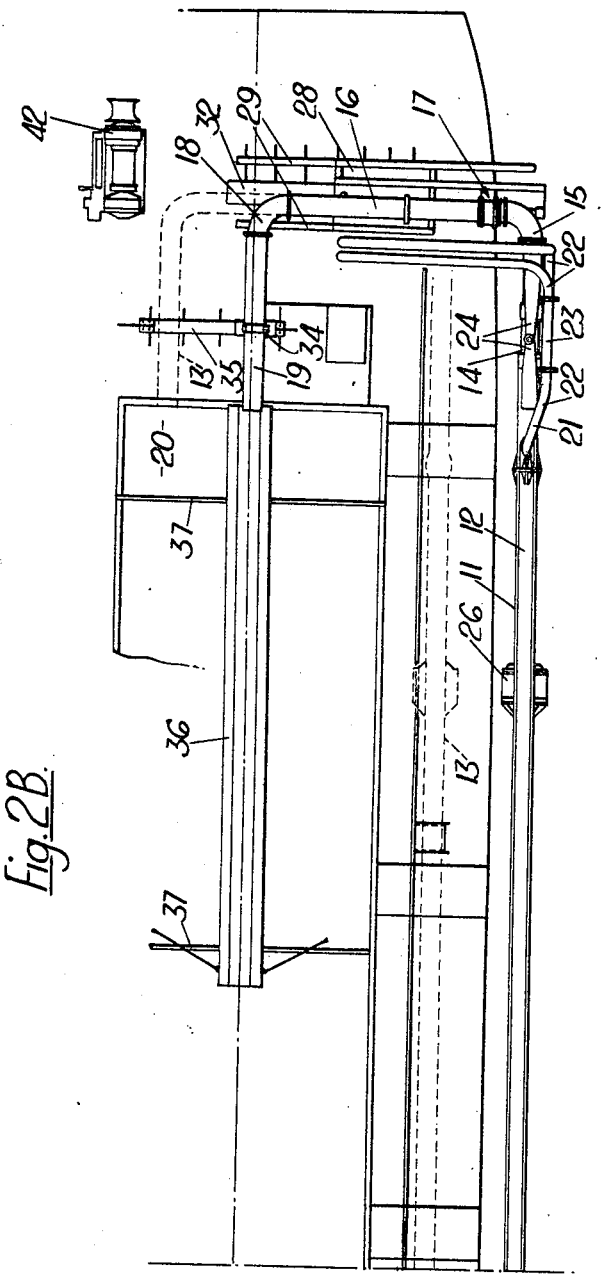

3,490,157
SUCTION PIPE HANDLING EQUIPMENT FOR A SUCTION DREDGER
James Venus, North Devon, England, assignor to Appledore Shipbuilders Limited, North Devon, and Penfolds Engineering & Construction Limited, Barnham, Bagnor Regis, Sussex, England, both British companies
Filed June 19, 1967, Ser. No. 646,881
Claims priority, application Great Britain, June 20, 1966, 27,537/66
Int. Cl. E02f 5/28, 3/88; B11e 5/02
U.S. Cl. 37—72        11 Claims

ABSTRACT OF THE DISCLOSURE

A suction dredger in which the suction pipe, which extends generally fore and aft, is hinged for folding, and when folded is carried by two gantries forward and amidships which travel athwartships on rails to transport the pipe between an inboard stowed position and an outboard position where the pipe is over the side of the vessel. In the outboard position, the pipe can be unfolded and the aft end, which is provided with a dredging head, lowered beneath the water, the dredging head end of the unfolded pipe being raised and lowered by a non-travelling luffing derrick located aft. The forward end of the pipe is coupled by a flexible pipe length and a swivel elbow to a transverse pipe extending athwartships to an inboard location where its inboard end is connected by a second non-swivel elbow to a fore-and-aft delivery pipe. Both the transverse and delivery pipes travel with the suction pipe when it is transported athwartships on the gantries.

---

Figure 1A:
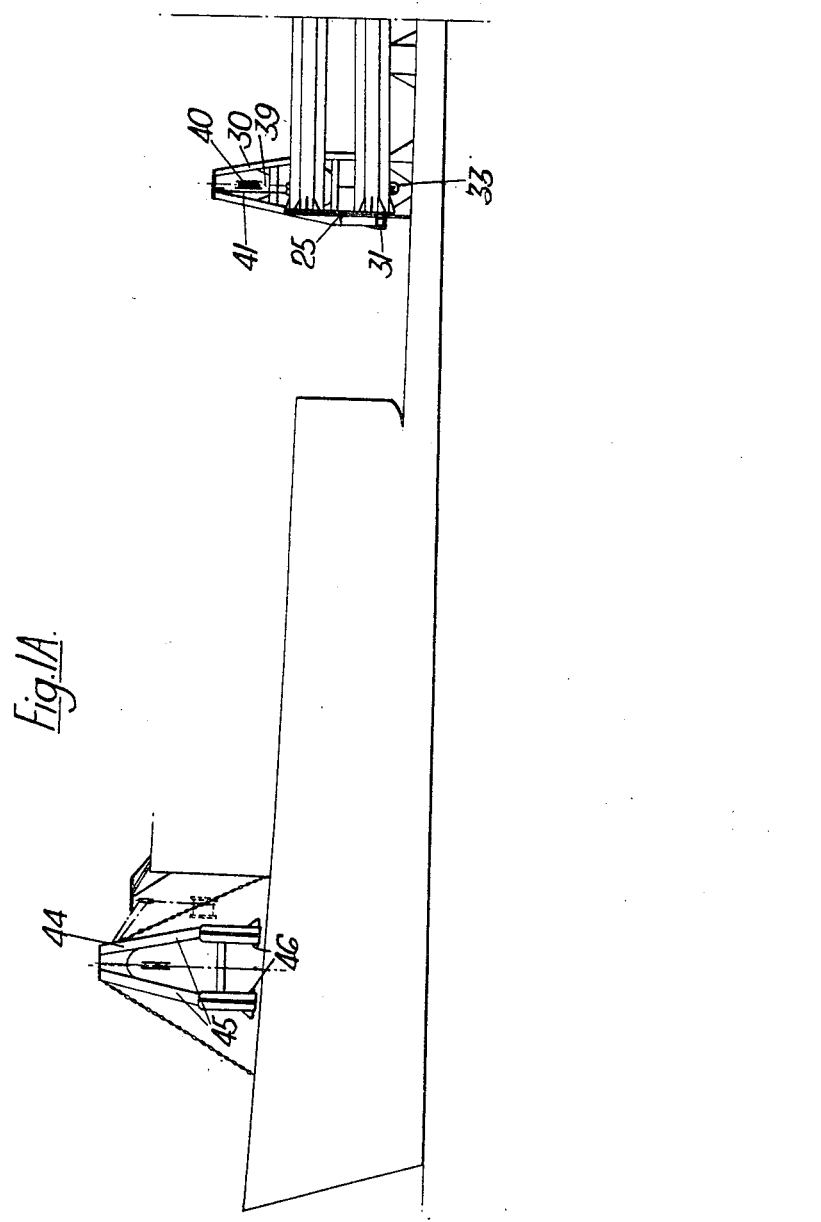

This invention relates to suction dredgers and is concerned more particularly with the gear for manipulating the cargo suction pipe between the inboard stowed position and the outboard working position.

Hitherto, cargo suction pipes on dredgers have been commonly handled by means of luffing hoists or gantries and this arrangement has certain disadvantages. It is therefore an object of the invention to provide improved equipment for performing this function.

According to the present invention, in a suction dredger the suction pipe is carried by two or more gantries travelling parallel to move the pipe bodily between an inboard and an outboard position with a rectilinear motion.

Preferably, the suction pipe has two lengths hinged to one another and when stowed extends fore and aft horizontally in a folded condition, and one gantry handles the aft end and a second gantry the forward end of the folded pipe.

The forward end of the suction pipe may be connected by a flexible pipe length and a swivel bend to a transverse pipe which is in turn connected by a non-swivel bend to a cargo delivery pipe lying fore and aft. The transverse pipe and the delivery pipe can move together athwartships with the gantries and the suction pipe, the transverse pipe being mounted on the forward gantry and thereby supporting the forward end of the suction pipe.

In the preferred form also the lower length of the suction pipe carrying the dredging head folds forward under the upper length for stowage, and a third gantry is provided aft of the two aforesaid gantries to raise and lower the aft end of the pipe when unfolded. The third gantry can be a luffing gantry.

One form of construction in accordance with the invention will now be described by way of example with reference to the accompanying drawing, in which:

FIGURE 1 is an elevation of a sand suction dredged, and
FIGURE 2 is a plan view.

The vessel illustrated has a cargo suction pipe 11 in steel with the usual pumping channels 12 extending along the outside of it; when not in use this pipe lies fore and aft along one side of the deck 10 as shown in broken lines at 13. The forward end of the suction pipe 11 is attached by a short length of flexible pipe 14 to an elbow bend 15 at the outboard end of a further pipe 16 which extends transversely of the ship's deck forward, the elbow being jointed to the transverse pipe by means of a swivel connection 17. The inboard end of the transverse pipe 16 is connected by a nonswivelling elbow bend 18 to a fore and aft delivery pipe 19 that runs back to terminate at the forward end of the cargo hold 20. The pump channels 12 on the suction pipe 11 are coupled to the ship's pumping plant by means of pipes 21 made up of steel sections 22 and flexible sections 23. The flexible section 14 of the suction pipe 11 is spanned above and below by articulated links 24 extending from the steel pipe sections on either side.

The cargo suction pipe 11 is hinged at a point 25 intermediate its ends so that it can be folded for stowage. When stowed, the lower length 11B of the suction pipe, leading to the dredging head 26, lies folded forward under the upper length 11A so that the two lengths are parallel to one another and horizontal as shown, the bottom end of the lower length 11B and the dredging head 26 being suspended below the upper length 11A by means of a shackle 27.

The transverse pipe 16 is mounted on a forward gantry 28 which runs on rails 29 across the deck. Likewise the aft end of the upper length 11A of the suction pipe is slung from the head of a mid gantry 30 which runs across the deck on rails 31. These two gantries 28 and 30 are traversed by independent rams 32, 33 respectively. By this means, the complete suction pipe 11 can be shifted sideways from the stowed position over the deck at 13 to the position over the side of the vessel illustrated in full lines. For the purpose of this movement the delivery pipe 19, which travels across the deck along with the rest, is supported on a trolley 34 running on a rail 35. When the suction pipe 11 is moved sideways into the outboard or working position, the delivery pipe comes into alignment with a cargo chute 36. The cargo chute is supported on movable tubular beams 37 spanning the cargo hold opening and the delivery pipe 19 terminates over the forward end of this chute.

A cargo winch 38 is associated with the mid gantry 30. One of the functions of this winch is to raise and lower the aft end of the section 11A of the suction pipe, when this pipe is outboard, by means of a line 39 passing over a sheave 40 in the gantry head. When the suction pipe is stowed and during traverse of the gantries the pipe section 11A is suspended from the head of the gantry 30 by means of a sling 41 but the sling is detached when the pipe is to be lowered over the side into the working position. A second cargo winch 42 is associated with the forward gantry 28 and one of the functions of the winch 42 is to warp a wire 43 attached to the lower section 11B of the suction pipe near the dredging head for the purpose of swinging the pipe section 11B under and forward about the hinge connection 25 into the folded condition.

At the aft end of the vessel there is a further gantry or derrick 44. This does not travel on rails like the mid and forward gantries but it is a luffing gantry having legs 45 hinged at their lower end on feet 46 on the deck to swing to and fro athwart-ships. The head of the gantry 44 reaches out over the side of the vessel to handle the end of the lower section 11B of the suction pipe 11 carrying the dredging head. A third winch 47 is associated with the aft gantry 44 and one of the functions of this winch is to warp a wire 48 attached to the pipe section 11B close to the dredging head. When the folded suction pipe is outboard and the shackle 27 is unfastened warping of the wire 48 will pull the dredging head end of the pipe section 11B under and rearward, and finally upward, until the suction pipe 11 is straight and unfolded, whereafter the pipe can be lowered into the working position beneath the water by the mid and aft winches 38, 47.

The control of the gantries can be located at any desired central location, which will normally be the wheel house. The gantries can be controlled with facility by one crewman. As compared with the prior luffing gantry arrangements for handling the cargo suction pipe, only one swivel elbow and gland assembly is required instead of two, and the flexible pipe length connecting the steel pipe to the swivel elbow is not subjected to any twisting action while the suction pipe is being launched from the stowed to the outboard position so that the lift of this flexible pipe is prolonged.

I claim:

1. A suction dredger, having a deck; a first track on the deck running athwartships; a second track on the deck spaced forward of said first track and also running athwartships; first and second travelling gantries mounted respectively on said first and second tracks to travel athwartships thereon parallel to one another between respective inboard stations and respective outboard stations, in which outboard stations the gantry heads project over the side of the vessel; a suction pipe extending mainly fore and aft and carried by said gantries whereby said pipe is moved bodily between inboard and outboard positions as said gantries travel; a dredging head on one end of said pipe; the pipe in said outboard position being suspended out over the side of the vessel so that the end of the pipe having the dredging head thereon can be lowered beneath the water; and a transverse pipe coupled to the other end of said suction pipe and extending inboard therefrom said transverse pipe being carried by said second gantry, whereby said suction pipe, and transverse pipe both move together athwartships.

2. A dredger according to claim 1, comprising respective individual hydraulic rams coupled to move said first and second gantries.

3. A dredger according to claim 1, wherein the suction pipe is in two lengths hinged to one another for folding, and when stowed inboard extends fore and aft substantially horizontally in the folded condition, the first and second gantries carrying, respectively, the aft and forward extremities of the folded pipe.

4. A dredger according to claim 3, wherein the first gantry is located amidships, and a derrick is located aft to raise and lower the dredging head end of the suction pipe when the pipe is unfolded.

5. A dredger according to claim 4, wherein said derrick is a luffing derrick.

6. A dredger according to claim 4, wherein a warping line from the derrick is attached to the dredging head end of the suction pipe for unfolding the pipe.

7. A dredger according to claim 6, wherein a second warping line from said second gantry is attached to the dredging head end of the suction pipe for folding the pipe.

8. A dredger according to claim 1, wherein said first gantry is arranged for raising and lowering the suction pipe.

9. A dredger according to claim 1, comprising a swivel elbow bend and a flexible pipe length coupling said transverse pipe to said suction pipe.

10. A dredger according to claim 1, comprising a cargo delivery pipe extending fore and aft and coupled to the inboard end of said transverse pipe by an elbow bend, and a trolley mounted to travel on a rail athwartships and carrying said delivery pipe, whereby said delivery pipe moves athwartships together with said suction pipe and transverse pipe.

11. A dredger according to claim 10, further comprising a cargo chute leading into a cargo hold, the delivery end of said delivery pipe lying over said cargo chute when the suction pipe is in its outboard position.

References Cited

UNITED STATES PATENTS

| 399,251 | 3/1889 | Edwards | 37—58 |
|---|---|---|---|
| 1,712,312 | 5/1929 | Sensibar | 37—72 |
| 2,289,260 | 7/1942 | Gerken | 114—26 |
| 3,130,840 | 4/1964 | Myers et al. | 212—14 XR |
| 3,217,432 | 11/1965 | Joyce | 37—72 |
| 3,228,534 | 1/1966 | Thaeter et al. | 212—144 XR |
| 3,399,630 | 9/1968 | Wilson | 104—162 |

FOREIGN PATENTS

| 31,052 | 10/1933 | Netherlands. |
|---|---|---|
| 657,181 | 9/1951 | Great Britain. |
| 1,136,471 | 9/1962 | Germany. |
| 1,349,019 | 12/1963 | France. |

ROBERT E. PULFREY, Primary Examiner

C. D. CROWDER, Assistant Examiner

U.S. Cl. X.R.

37—58; 104—162; 212—3, 14